(12) United States Patent
Visenzi (10) Patent No.: US 9,056,641 B2
(45) Date of Patent: Jun. 16, 2015

(54) HOOKING SYSTEM FOR A MOTORCYCLE BAG

(75) Inventor: Giuseppe Visenzi, Brescia (IT)

(73) Assignee: GIVI S.R.L. UNIPERSONALE, Flero (BS) (IT)

( * ) Notice: Subject to any disclaimer, the term of this patent is extended or adjusted under 35 U.S.C. 154(b) by 404 days.

(21) Appl. No.: 13/578,363

(22) PCT Filed: Feb. 7, 2011

(86) PCT No.: PCT/IB2011/000239
§ 371 (c)(1),
(2), (4) Date: Oct. 17, 2012

(87) PCT Pub. No.: WO2011/098897
PCT Pub. Date: Aug. 18, 2011

(65) Prior Publication Data
US 2013/0043289 A1  Feb. 21, 2013

(30) Foreign Application Priority Data
Feb. 10, 2010 (IT) ............................. MI2010A0198

(51) Int. Cl.
*B62J 9/00* (2006.01)
(52) U.S. Cl.
CPC ... *B62J 9/00* (2013.01); *B62J 9/001* (2013.01)
(58) Field of Classification Search
CPC ................ B62J 9/00; B62J 9/001; B62J 7/04
USPC ................... 224/423, 426, 431, 449
See application file for complete search history.

(56) References Cited

U.S. PATENT DOCUMENTS

| 5,435,471 | A * | 7/1995 | Chuang | 224/419 |
|---|---|---|---|---|
| 5,810,230 | A * | 9/1998 | Nutto | 224/417 |
| 6,631,835 | B2 * | 10/2003 | Fang | 224/413 |
| 8,028,877 | B2 * | 10/2011 | Lien | 224/417 |
| 8,292,139 | B2 * | 10/2012 | Golub et al. | 224/419 |
| 8,864,002 | B2 * | 10/2014 | Iida et al. | 224/413 |
| 2003/0066854 | A1 * | 4/2003 | Heinrich et al. | 224/413 |
| 2006/0138185 | A1 | 6/2006 | Lien | |
| 2006/0163302 | A1 * | 7/2006 | Knoch et al. | 224/413 |
| 2009/0308903 | A1 * | 12/2009 | Vigeant et al. | 224/431 |

FOREIGN PATENT DOCUMENTS

| DE | 9215430 | 1/1993 |
|---|---|---|
| DE | 19827973 | 3/2000 |

* cited by examiner

Primary Examiner — J. Gregory Pickett
Assistant Examiner — John Cogill
(74) Attorney, Agent, or Firm — Jacobson Holman, PLLC.

(57) ABSTRACT

A hooking system for a motorcycle bag is described, comprising a framework, intended to be constrained to a fixed structure of a motorcycle, and a hooking plate, intended to be constrained to the bag. The hooking plate is provided with first fixed hook-shaped hooking means, suitable to hold a first portion of the framework, and second fixed support means, suitable to receive a second portion of the framework opposite to such a first portion. The system comprises moveable hooking means positioned at the second fixed support means and able to be rotatably actuated, by means of a lock mechanism, between a first operative position, to hold the second portion of the framework and keep such a framework hooked to the hooking plate, and a second non-operative position, to release the second portion of the framework and, thus, obtain the disengagement of the bag from the motorcycle.

9 Claims, 11 Drawing Sheets

HOOKING SYSTEM FOR A MOTORCYCLE BAG

This is a national stage of PCT/IB11/000239 filed Feb. 7, 2011 and published in English, which has a priority of Italian no. MI2010A 000198 filed Feb. 10, 2010, hereby incorporated by reference.

The present invention refers to an improved hooking system for bags or carrier bags for motorcycles.

It is well known to use, on motorcycles in general, cases, carriers or bags suitable for housing luggage, helmets or other accessories. Such bags are usually applied at the rear part of the motorcycle and normally comprise a special framework, which is stably fixed to the motorcycle itself, and systems for hooking to such a framework. The hooking systems are usually of the removable type and are foreseen in the bottom portion of the bag, which can be made both in fabric or in plastic or metal material.

Various types of hooking systems are known that propose to ensure a stable and safe fixing of the bag to the motorcycle, simultaneously avoiding accidental unhooking or false hooking. Some of these hooking systems however, require the use of specific equipment to obtain the hooking and the disengagement of the bag with respect to the motorcycle, thus being complicated to use. Other hooking systems are provided with button or lever-operated means so as to make it possible to apply and remove the bag. Such means are clearly very easy to actuate, but do not prevent unintentional detaching of the bag from the motorcycle and normally foresee complicated mechanisms for their operation.

The purpose of the present invention is therefore that of making an improved hooking system for bags or carrier bags for motorcycles that is capable of solving the aforementioned drawbacks of the prior art in an extremely simple, cost-effective and particularly functional manner.

In detail, one purpose of the invention is that of making a hooking system for bags for motorcycles that is extremely simple to actuate, both during hooking and unhooking of the bag.

Another purpose of the invention is that of making a hooking system for bags for motorcycles that has substantial safety and stability characteristics, avoiding the unintentional disengagement of the bag from the motorcycle.

A further purpose of the invention is that of making a hooking system for bags for motorcycles that has a simple and strong structure.

These purposes according to the present invention are achieved by making an improved hooking system for bags or carrier bags for motorcycles as outlined in claim 1.

Further characteristics of the invention are highlighted in the dependent claims, which are an integrating part of the present description.

The characteristics and the advantages of an improved hooking system for bags or carrier bags for motorcycles according to the present invention shall become clearer from the following description, given as an example and not for limiting purposes, with reference to the attached schematic drawings in which.

With reference to the figures, the components, part of a system for hooking and unhooking a bag 10 for motorcycles according to the present invention are shown. The bag 10 can be of the type that can be applied to a fixed structure (not shown) of a motorcycle, both in the lateral position ("saddle bag", FIGS. 1-10), and over the rear mudguard of the motorcycle itself ("topcase", FIG. 11), although other applications in different positions on the motorcycle should not be excluded without for this reason departing from the scope of protection of the present invention.

The bag 10 is provided with a base portion 12, which can advantageously be preformed in the production step of the bag 10 itself, on which a main hooking plate 14 can be constrained. The main hooking plate 14 is suitably configured to be connected to a hooking framework 16, of the tubular type, in turn intended to be constrained to a fixed structure of the motorcycle, such as for example the rear mudguard or the load-bearing framework of the motorcycle itself.

In the detail, the main hooking plate 14 is provided with first hook-shaped fixed hooking means 18, suitable to hold a first portion 20 of the tubular hooking framework 16. In the embodiment shown in FIGS. 1 to 10, relative to a hooking system for saddle bags, the hook-shaped hooking means 18 are in number of two and are arranged at the lower part on the plate 14, with the entrance facing downwards.

The main hooking plate 14 is thus provided with further fixed support means 22, suitable to receive a second portion 24 of the tubular hooking framework 16 opposite to the aforementioned first portion 20. The second portion 24 of the tubular hooking framework 16 is held in position on the fixed support means 22 by at least one mobile hooking means or bolt 26. The bolt 26 can be rotatably actuated, by means of a lock mechanism 28 with a key 30, between a first operative position or closed position, in which the framework 16 is kept hooked to the plate 14, and a second non-operative position or open position, in which such a framework 16 and, thus, the bag 10, can be released with respect to the plate 14 itself.

The hooking system according to the invention is mounted by inserting the lock block 28 into a special seat 32 obtained on the plate 14, at the bolt 26. On the inner part of the plate 14 a sub-lock plate 34 is thus fixed to the lock block 28, for example through a screw or Seeger ring, in such a manner that, by rotating the key 30, such a sub-lock plate 34 rotates with the same angular movement of the key 30, actuating the bolt 26. The bolt 26 is in turn inserted in a respective seat 36 obtained on the front wall of the plate 14 and, in order to fix it, a peg 38 that is fitted through an opening 40 (FIG. 5B) made on a wall of the plate 14 itself is used. The peg 38, passing through the bolt 26 in the through hole 42 provided therein (FIG. 6), fits into the plate 14, ensuring a rotatable coupling of the bolt 26 itself with such a plate 14.

The bolt 26 is moreover elastically connected to the plate 14 through a spring coil 44. The fixing of the spring 44 occurs by inserting a first hook-shaped end part 46, of the spring 44 itself inside a hole 48 obtained on the rear wall of the bolt 26, whereas the other ring-shaped end part 50 of the spring 44, wraps around a pin 52 obtained integral with the rear wall of the plate 14. On the rear wall of the plate 14, by means of screws that insert into special seats 54, a closure casing 56, which protects the entire mobile hooking mechanism and improves the appearance of the plate 14 itself, is then fixed.

At this point the hooking system thus assembled can be fixed to the base 12 of the bag 10 by means of screws which are fixed inside the respective seats 58 obtained on the rear wall of the plate 14. In order to obtain a better appearance, on the base 12 of the bag 10 it is advantageously possible to form, by moulding or forming, one or more grooves 60 which receive the plate 14, and possibly also the tubular framework 16, so as to make the entire hooking system according to the invention less visible from outside.

The operation of the system is very simple and occurs as follows, with reference to the sequence of FIGS. 7 to 10. In order to fix the complete bag 10 to the tubular framework 16 applied to the motorcycle, it is necessary to:

rotate the key 30 to the open position, so that the bolt 26 is in the open or non-operative position. The stabilisation of the open position or non-operative position of the bolt 26 is ensured by the action of the spring 44;

couple the hook-shaped hooking means 18 of the plate 14 with the first (lower) portion 20 of the framework 16 and, through rotation, position the second (upper) portion 24 of the framework 16 itself over the support means 22 of the plate 14;

rotate the key 30 to the closed position, so that the bolt 26 is brought to the closed or operative position and therefore does not allow the bag 10 to be removed from the motorcycle. The movement of the bolt 26 towards its operative position occurs since the sub-lock plate 34 is provided with an inclined surface 62 that, by rotating, engages with a lip 64 obtained on the rear wall of the bolt 26 itself. The action of the inclined surface 62 on the lip 64 allows the bolt 26 to rotate around the respective peg 38, overcoming the action of the spring 44.

In order to unhook the bag 10 it is simply sufficient to rotate the key 30 to the open position, in such a manner that the spring 44 brings the bolt 26 into the open position, and then remove the bag 10 itself from the plate 14.

Figure 1:
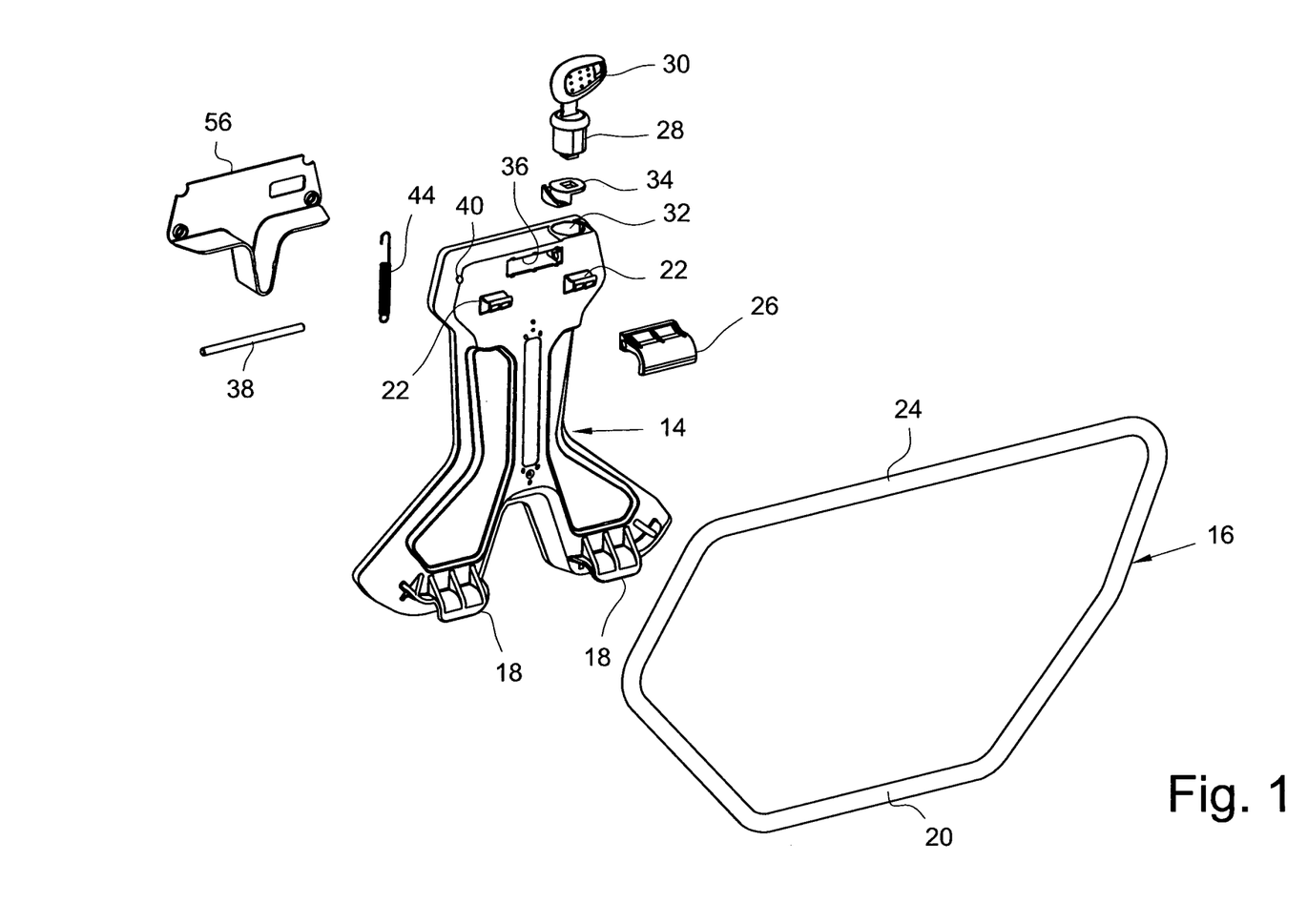
FIG. 1 is an exploded view of the components forming the hooking system for bags for motorcycles according to the present invention.
Figure 2:
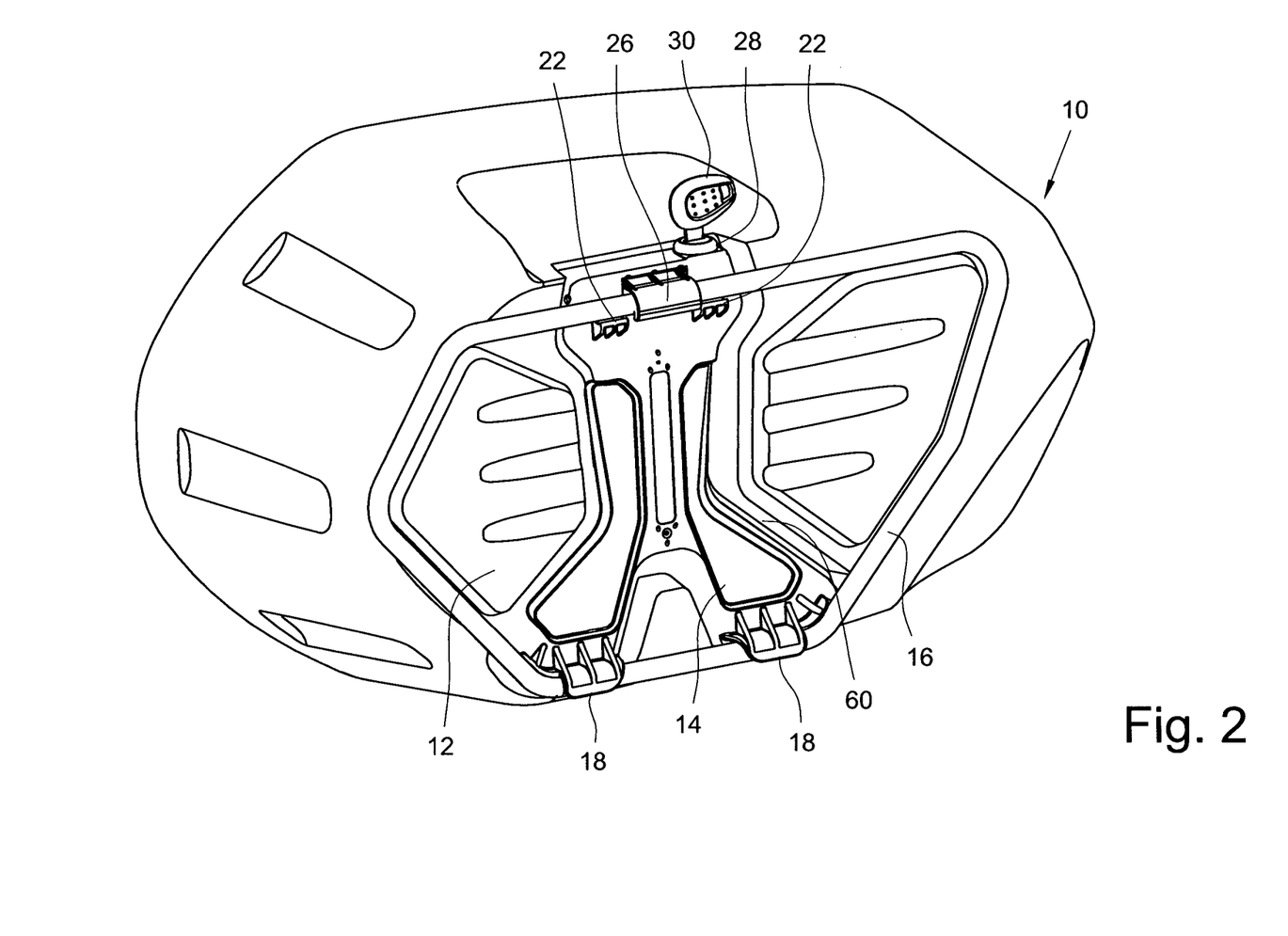
FIG. 2 is a perspective view of the system of FIG. 1, shown in its mounted configuration and hooked to a generic bag for motorcycles.
Figure 3:
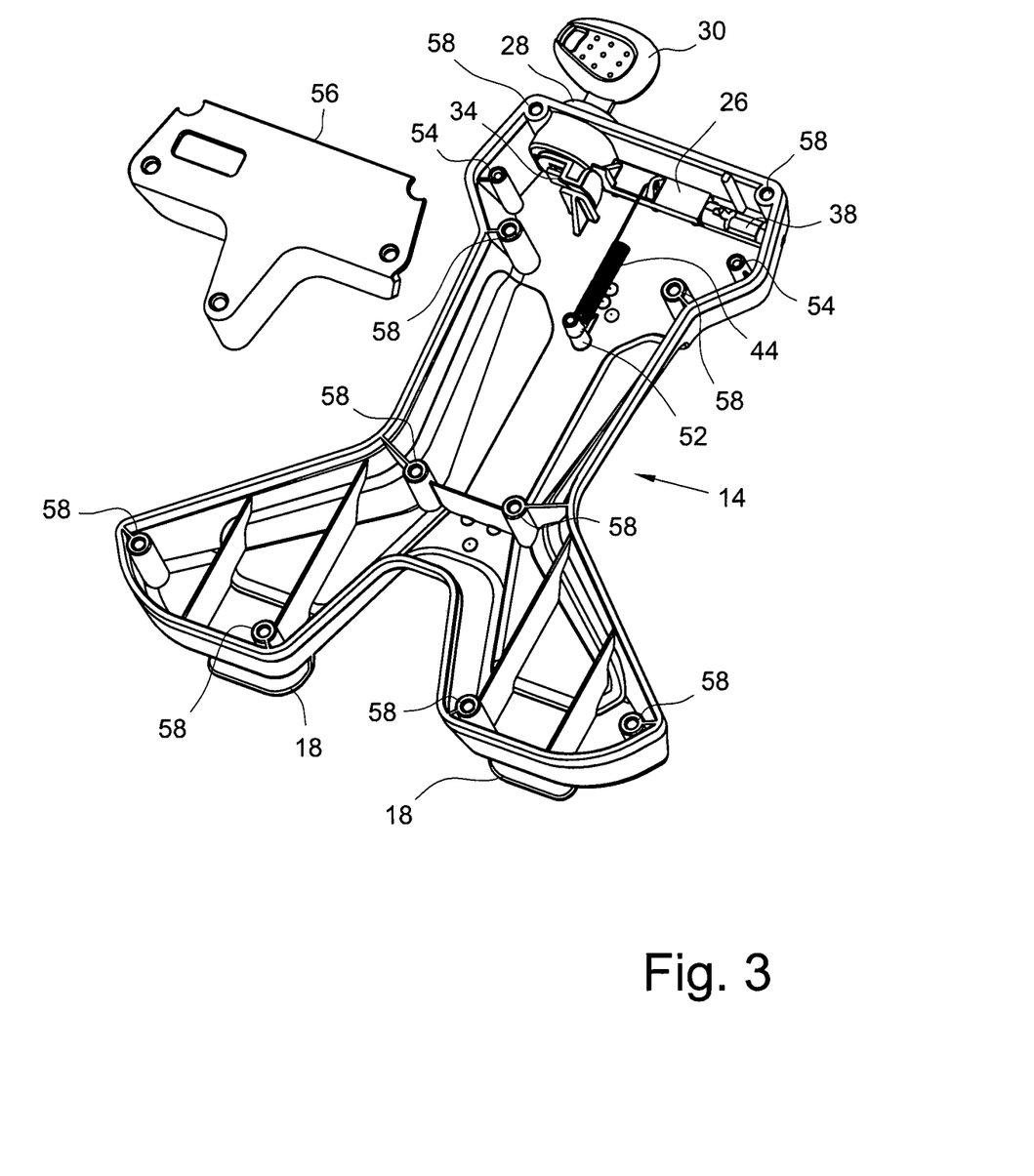
FIG. 3 is a rear view of the system of FIG. 1, shown in its closed position.
Figure 4:
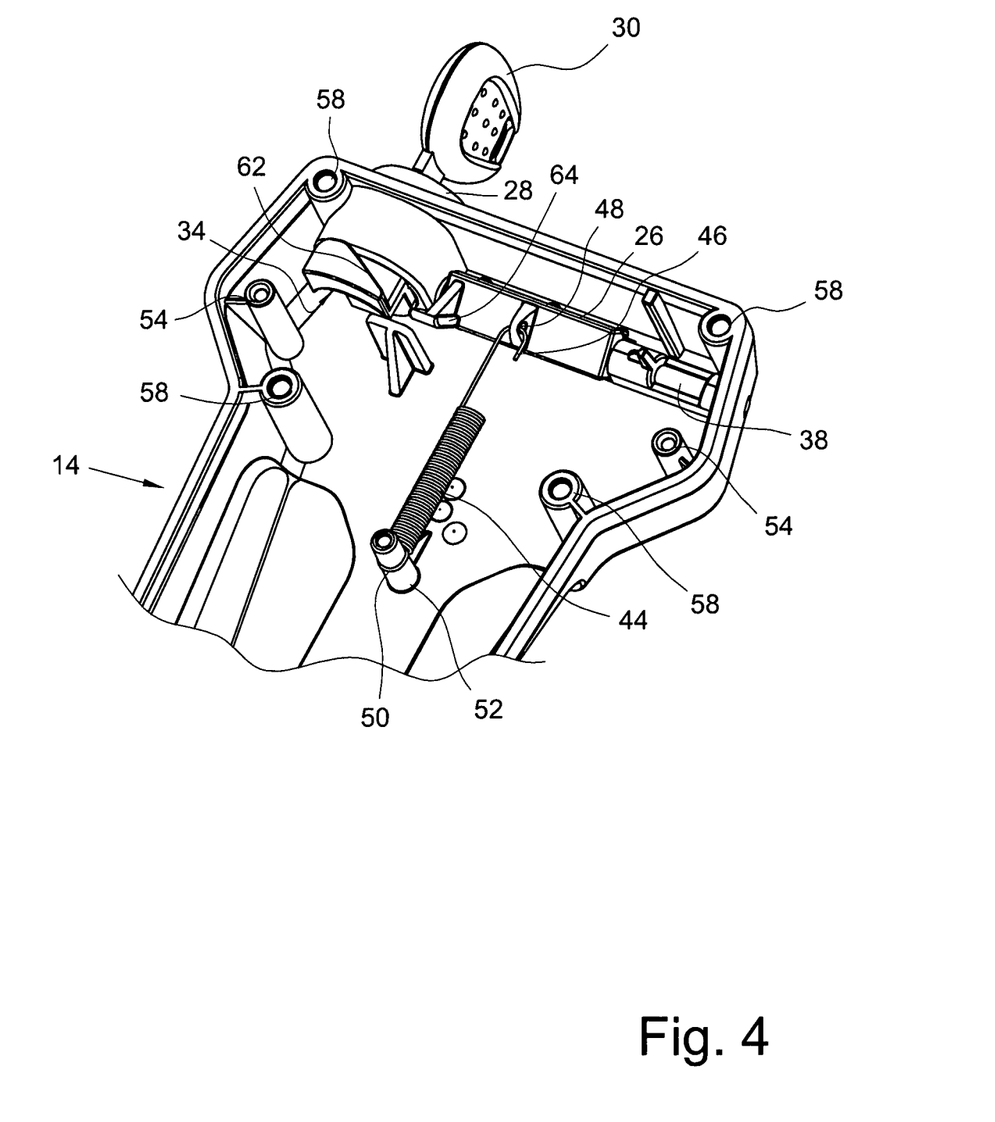
FIG. 4 is an enlarged rear view of the system of FIG. 1, shown in its open position.
Figure 5A:
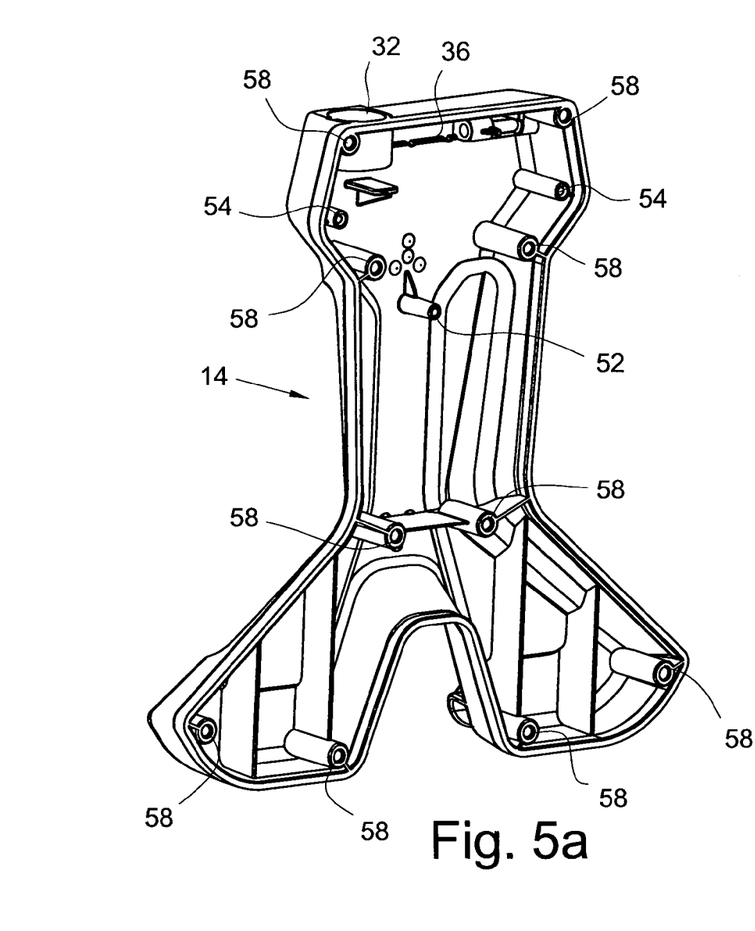
FIGS. 5A and 5B are perspective views, respectively from the rear and from the front side, of a component of the system of FIG. 1.
Figure 5B:
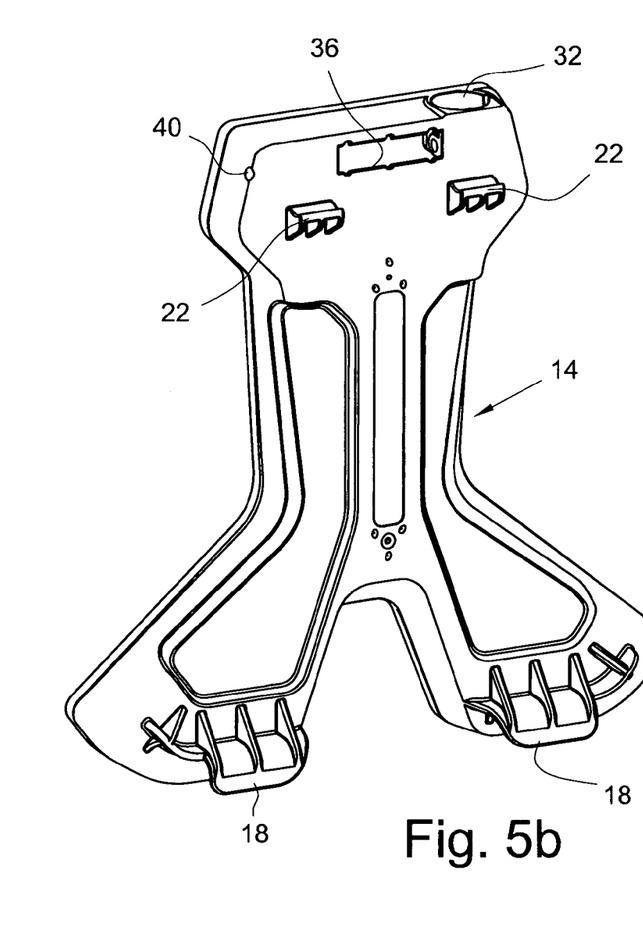
Figure 6:
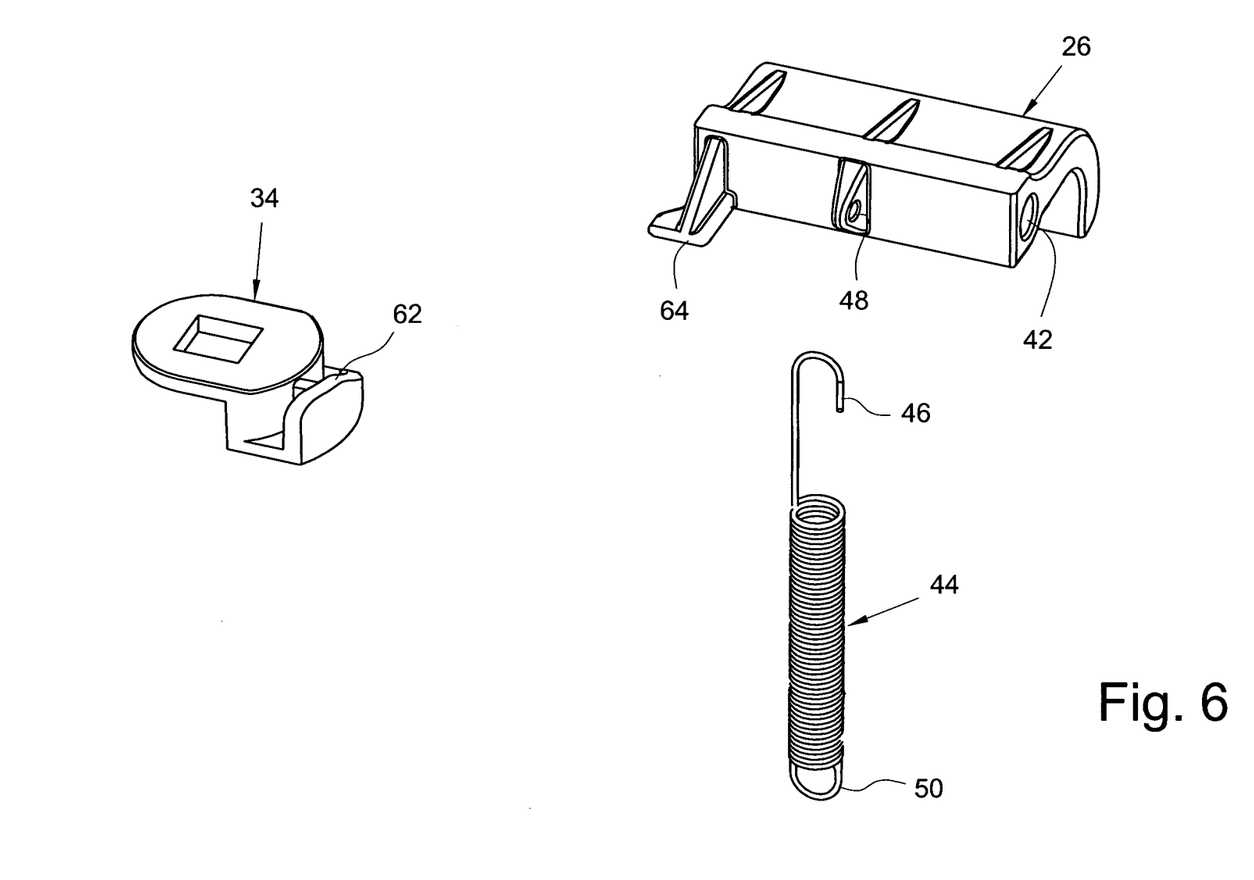
FIG. 6 is a perspective view of further components of the system of FIG. 1.
Figure 7:
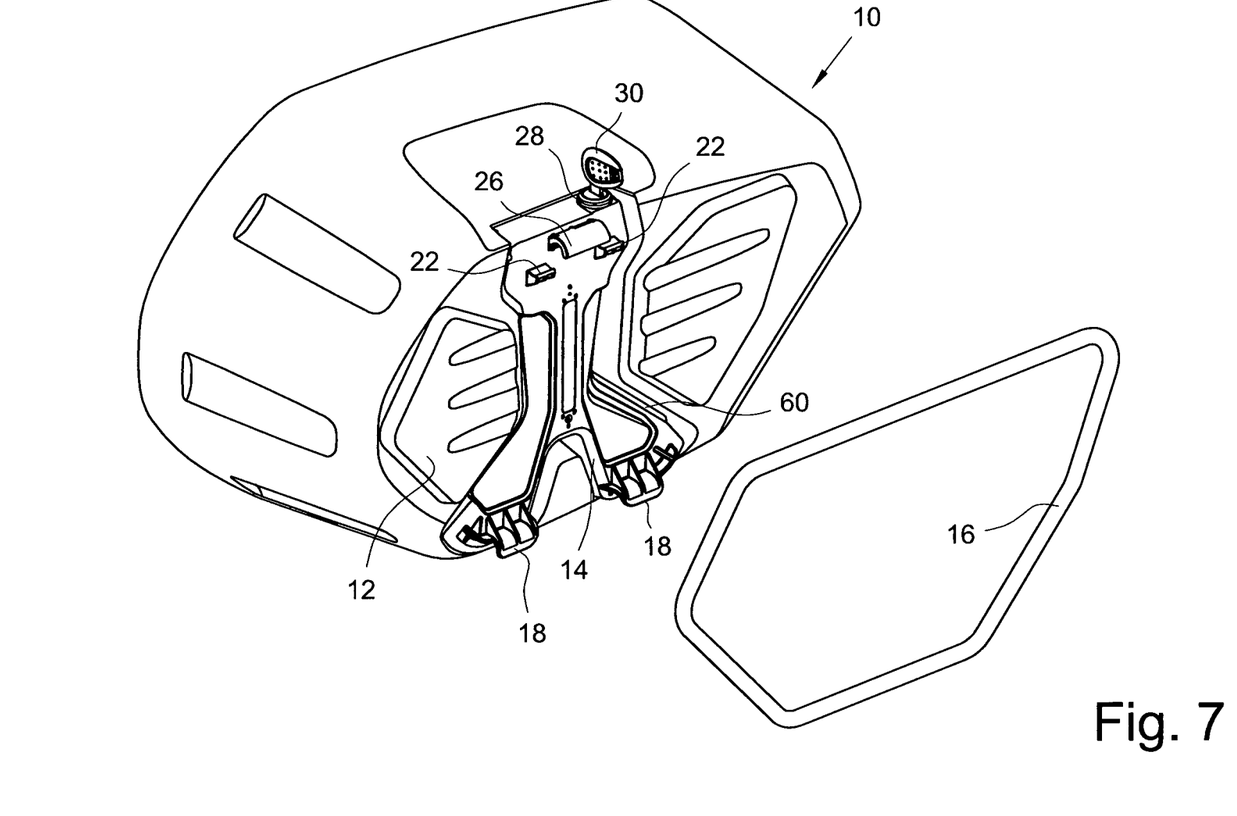
FIGS. 7 to 10 are schematic views illustrating the hooking and unhooking steps of a bag for motorcycles based upon the system according to the invention.
Figure 8:
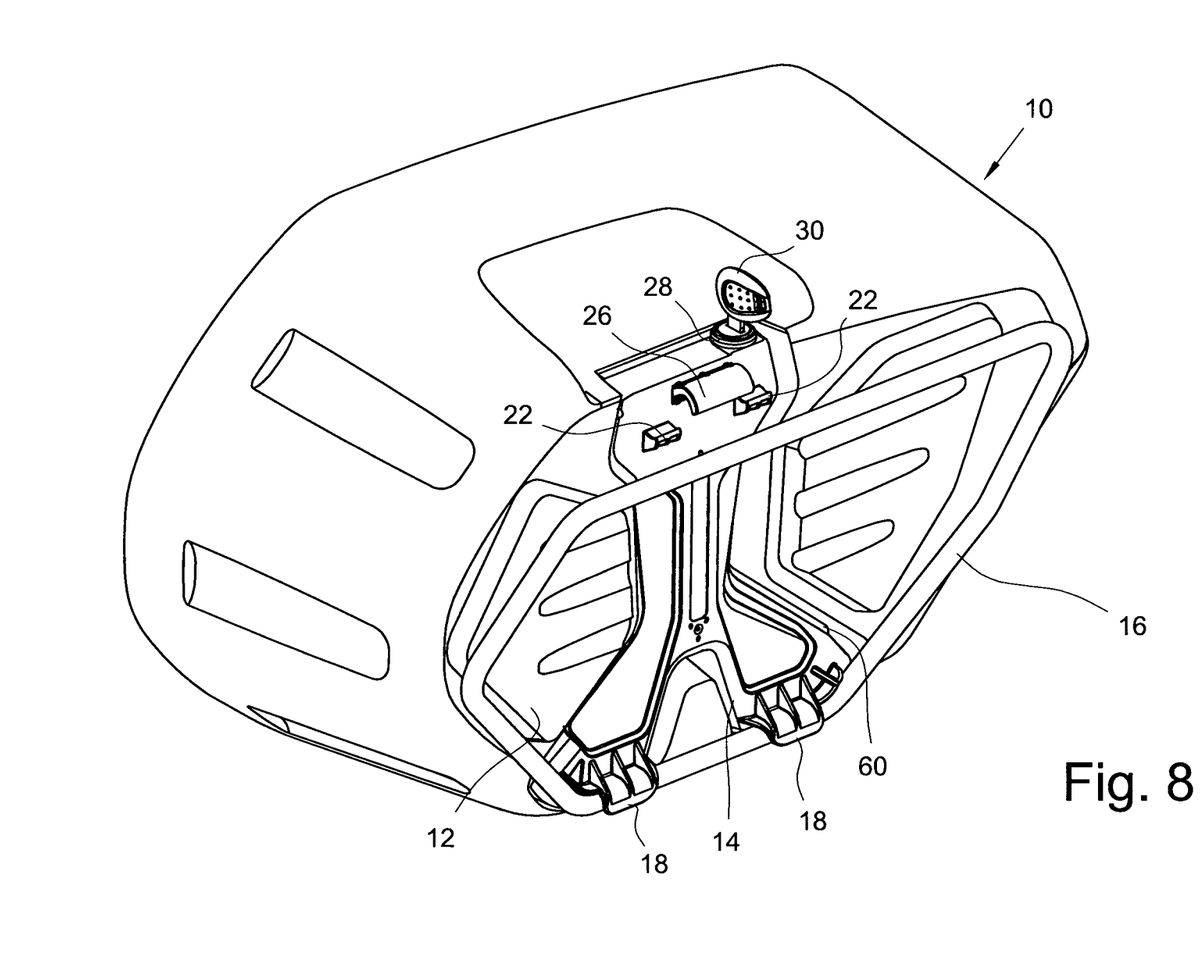
Figure 9:
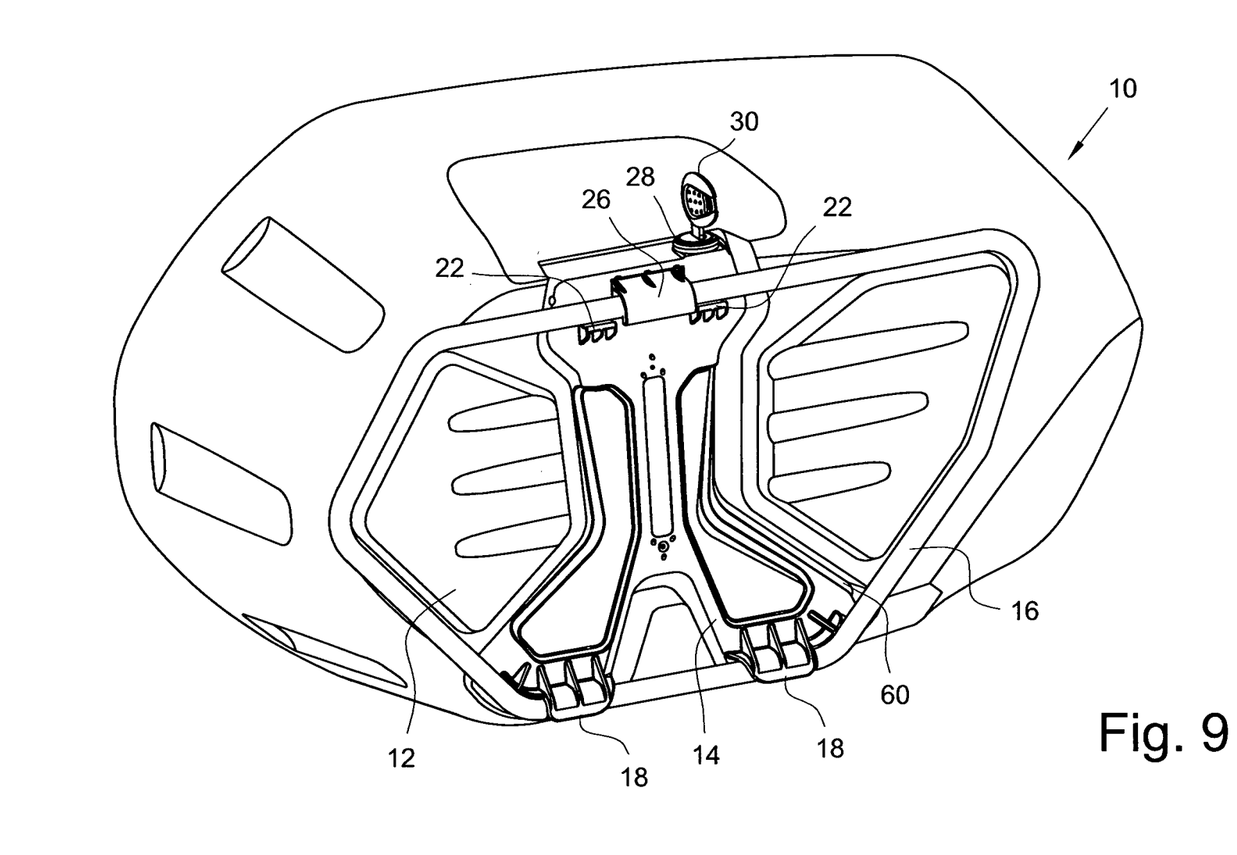
Figure 10:
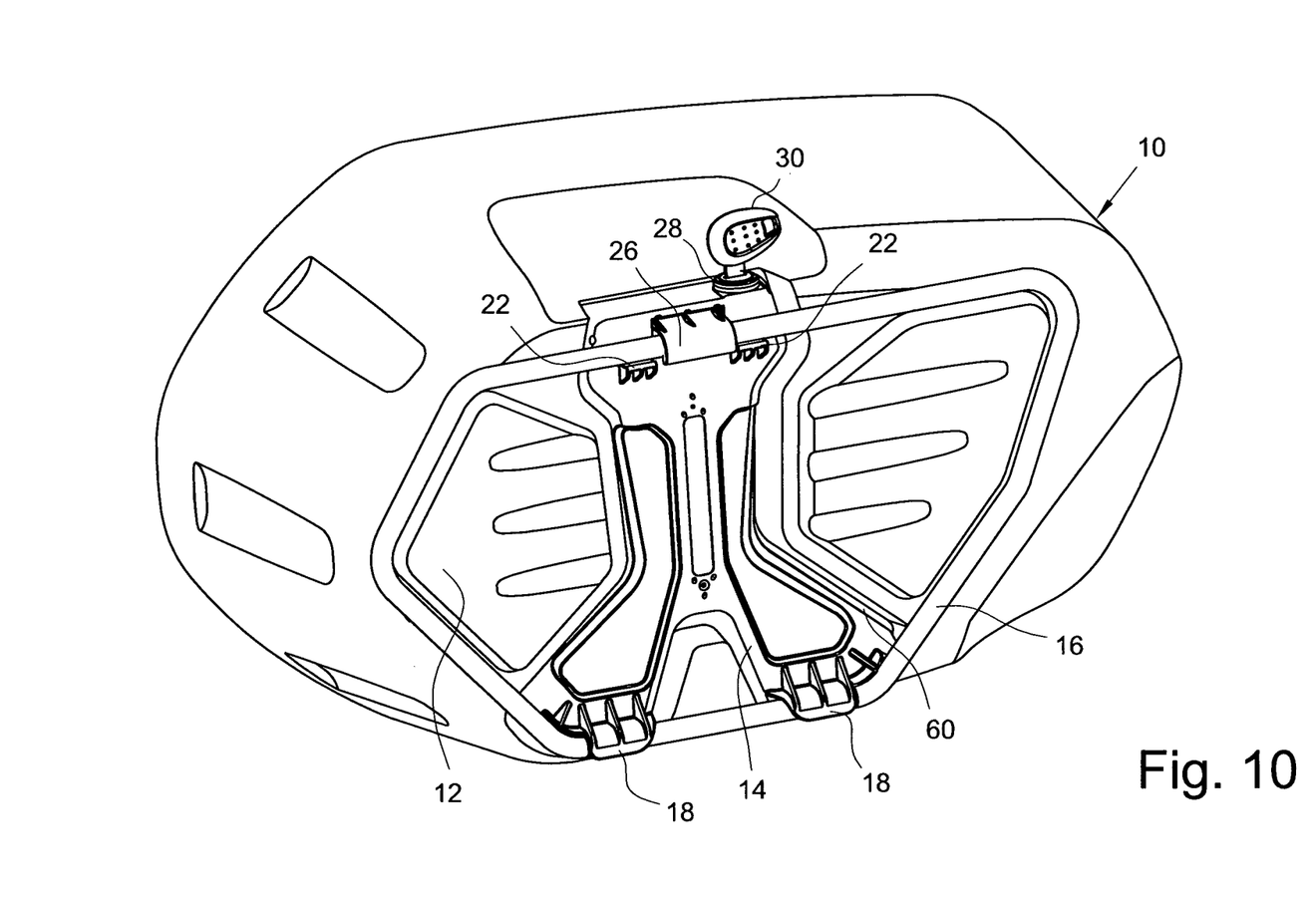
Figure 11:
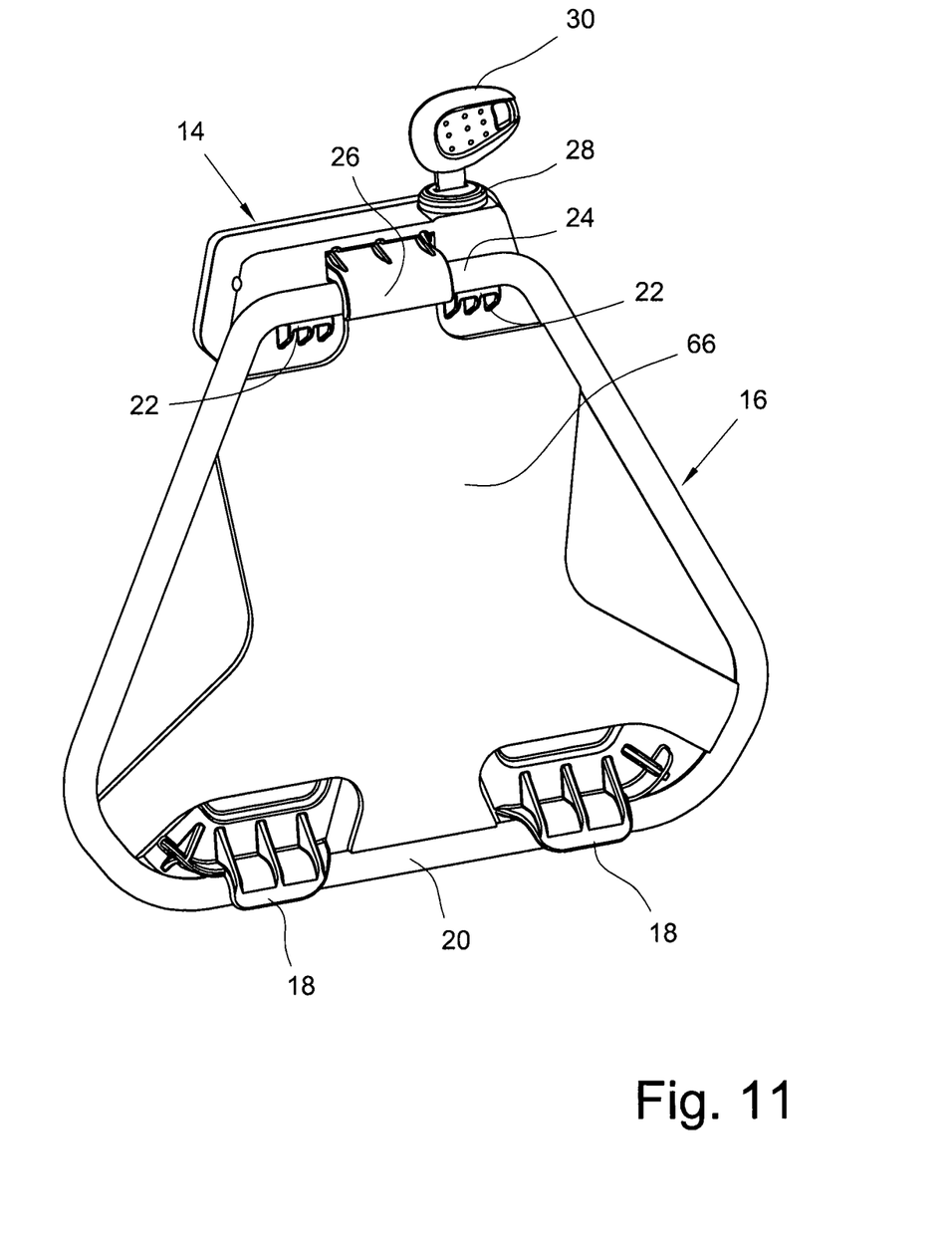
FIG. 11 is a perspective view of a variant of the hooking system for bags for motorcycles according to the present invention.

The hooking system described thus far, of the type that can be applied to saddle bags of a motorcycle, can also be used for so called "topcases" by simply modifying the shape of the hooking framework 16, as shown in FIG. 11. Such a framework 16 can indeed be provided with a central reinforcement wall 66 capable of bearing the weight of the topcase and preventing it from laying on the hooking plate 14 below it and on the respective mechanisms.

It has thus been seen that the improved hooking system for bags or carrier bags for motorcycles according to the present invention achieves the previously highlighted purposes.

The improved hooking system for bags or carrier bags for motorcycles of the present invention thus conceived can in any case undergo numerous modifications and variants, all covered by the same inventive concept; moreover, all the details can be replaced by technically equivalent elements. In practice the materials used, as well as the shapes and sizes, can be any according to the technical requirements.

The scope of protection of the invention is thus defined by the attached claims.

The invention claimed is:

1. A system for hooking and unhooking a bag with respect to a fixed structure of a motorcycle, comprising a tubular hooking framework, intended to be attached to said fixed structure, and a main hooking plate, intended to be attached to the bag, said main hooking plate being provided with first fixed hook-shaped hooking means suitable to attach to a first portion of the tubular hooking framework, and a second fixed support means suitable to receive a second portion of the tubular hooking framework opposite to said first portion, wherein a moveable hooking means is positioned at said second fixed support means and able to be rotatably actuated by means of a lock mechanism, between a first operative position, to hold said second portion of the tubular hooking framework and keeping said tubular hooking framework hooked to said main hooking plate, and a second non-operative position, to release said second portion of the tubular hooking framework and, thus, obtain the disengagement of the bag from the motorcycle, wherein said lock mechanism is integrally joined to a sub-lock plate in such a manner that, by rotating a key in said lock mechanism, said sub-lock plate rotates with the same angular movement as the key, actuating said moveable hooking means in the form of a bolt.

2. The system according to claim 1, wherein said bolt is elastically connected to said main hooking plate by means of a coil spring which, when not stretched, maintains said bolt in its non-operative position.

3. The system according to claim 2, wherein said bolt is inserted into a seat located on the front wall of said main hooking plate, a peg is fitted through an opening in a wall of said main hooking plate, and passes through said bolt into a through hole in said bolt and fitted into said main hooking plate to ensure a rotatable coupling of said bolt with said main hooking plate.

4. The system according to claim 3, wherein said sub-lock plate is provided with an inclined surface which, when rotated, is engaged with a lip located on the rear wall of said bolt, the action of the inclined surface on the lip allows said bolt to rotate around the peg, overcoming the action of said spring, to move to its operative position.

5. The system according to claim 2, wherein said spring is provided with a first hook-shaped end part, insertable into a hole located on a rear wall of said bolt, and a second ring-shaped end part around a pin located integral with a rear wall of said main hooking plate.

6. The system according to claim 1, comprising a closure casing fixable on the rear wall of said main hooking plate to protect said lock mechanism and aesthetically improve the appearance of said main hooking plate.

7. The system according to claim 1, wherein said main hooking plate is fixed to a base of a bag by means of screws which are fixed inside seats located on the rear wall of said main hooking plate.

8. The system according to claim 1, wherein there are two said first fixed hook-shaped hooking means arranged at the lower part on the main hooking plate, with the hook facing downwards, to receive a bag.

9. The system according to claim 1, wherein said tubular hooking framework is provided with a central reinforcement wall capable of bearing the weight of the bag and preventing it from touching said main hooking plate.

* * * * *